United States Patent
Curtis et al.

(10) Patent No.: US 6,687,902 B1
(45) Date of Patent: Feb. 3, 2004

(54) METHOD, SYSTEM, AND PROGRAM FOR DELETING USER SELECTED FILE SETS OF A PROGRAM

(75) Inventors: Bryce Allen Curtis, Round Rock, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,684

(22) Filed: Aug. 5, 1999

(51) Int. Cl.[7] .............................................. G06F 9/445
(52) U.S. Cl. ...................... 717/175; 717/174; 717/176; 717/177; 717/178
(58) Field of Search .......................... 717/169, 174–178

(56) References Cited

U.S. PATENT DOCUMENTS 5,930,514 A * 7/1999 Thompson et al. ............ 717/11
6,301,586 B1 * 10/2001 Yang et al. .................. 707/104

OTHER PUBLICATIONS

IBM Technical Disclosure Bulletin, "Removal of Software Configuration Changes", vol. 39, No. 3, pp.: 339–340, Mar. 1996.*

Gavron et al., "How to Use Microsoft Windows NT 4 WorkStation", pp. 22–23, 1996.*
Web Site: http://www.lclark.edu/ , "Getting Started with SilkyMail", pp. 1–5, 2002.*
Web Site: http://www.matchmaker.com/ , "Matchmaker Help—Mailbox", pp. 1–2, 2002.*
Indigo Rose Software Design Corp. "Setup Factory 4.0" User's Guide, 1998.

* cited by examiner

Primary Examiner—Gregory Morse
Assistant Examiner—Ted T. Vo
(74) Attorney, Agent, or Firm—David W. Victor; Konrad Raynes Victor & Mann

(57) ABSTRACT

Disclosed is a system, method, and program for uninstalling a program and deleting files. The program is defined by a plurality of file sets. Each file set defines a set of functions performed by the program. A flag is provided with each file set of the program indicating one of a first and second value. The flag values indicate those files which are enabled and unenabled to be deleted. A determination is made as to the file sets having the first flag value. A graphical user interface (GUI) then displays at least one user selectable option to uninstall at least one determined file set or file having the first flag value. User input is then received indicating file sets or files to delete or uninstall and the file sets the user input indicated to uninstall are uninstalld.

24 Claims, 6 Drawing Sheets

METHOD, SYSTEM, AND PROGRAM FOR DELETING USER SELECTED FILE SETS OF A PROGRAM

CROSS-REFERENCE TO RELATED APPLICATIONS

This application is related to the following co-pending and commonly-assigned patent applications, which applications were all filed on Mar. 29, 1999, and which applications are incorporated herein by reference in their entirety:

"A Cross-Platform Program, System, and Method Having a Global Registry Object for Mapping Registry Equivalent Functions in an AIX Operating System Environment," having Ser. No. 09/280,345;

"A Cross-Platform Program, System, and Method Having a Global Registry Object for Mapping Registry Equivalent Functions in an OS/2 Operating System Environment," having Ser. No. 09/280,350;

"A Cross-Platform Program, System, and Method Having a Global Registry Object for Mapping Registry Functions in a Windows Operating System Environment," having Ser. No. 09/280,349;

"Global Registry Object for Mapping Registry Functions and Registry Equivalent Functions Across Multiple Operating Systems in a Cross-platform Program," having Ser. No. 280,371;

"A Cross-platform Program, System, and Method Having a System Independent Registry for Use on Operating Systems Irrespective of a Registry Equivalent," having Ser. No. 09/280,368;

"A System, Method, and Program for Enabling a Use of Property Object Having a Variable for a Property Value in a Cross-Platform Program," having Ser. No. 09/280,344;

"A System, Method, and Program for Overriding Program Properties," having Ser. No. 09/280,346;

"A System, Method and Program for Providing an Object-Oriented Install Architecture," having Ser. No. 09/280,352;

"A System, Method, and Program for Automatic Error Detection While Utilizing a Software State Machine for Carrying out the Process Flow of a Software Program," having Ser. No. 09/280,375;

"A System, Method, and Program for Utilizing a Software State Machine for Carrying Out the Process Flow of a Software Program," having Ser. No. 09/280,376;

"A System, Method, and Program for Enabling a Software Program to Automatically Select a System-dependent Function," having Ser. No. 09/280,369;

"A System, Method, and Program for Mapping a Global Object to Desktop Elements of Different Operating Systems," having Ser. No. 09/280,372;

"A System, Method, And Program For Processing Dependencies Using a Dependency Object," having Ser. No. 09/280,370;

"A System, Method, and Program for Modifying a Text File," having Ser. No. 09/280,348;

"A System, Method, and Program for Updating Registry Objects With a Cross-platform Installation Program," having Ser. No. 09/280,351;

"A System, Method, and Program For Preserving Background Settings During Install and Uninstall Operations," having Ser. No. 09/280,374;

"A System, Method, And Program for Modifying a Library Object," having Ser. No. 09/280,347;

"A System, Method, And Program For Installation on Drives Using a Drive Object," having Ser. No. 09/280,353; and "A System, Method, and Program for Performing Program Specific Uninstall Operations," having Ser. No. 09/280,373.

BACKGROUND OF THE INVENTION

1. Field of the Invention

The present invention relates to a method, system, and program for uninstalling user selected file sets of a program.

2. Description of the Related Art

An installer program is a software program that enables a programmer to write specific code to install a given application program onto the drives of a computer in a way that enables the given application program to work correctly with the computer's environment, including its operating system. There are several types of installers—Java installers and operating system specific installers, e.g., Microsoft Windows installers, and International Business Machines ("IBM") OS/2 and AIX operating system installers, etc.* Many of the install programs existing today have various limitations in how they allow users to selectively remove program components.

The installer program typically includes an uninstaller function which directs the computer to uninstall or delete every program and file added to the system as a result of the installation. For instance, MICROSOFT WINDOWS 98** provides a program for uninstalling a Windows component, such as accessory programs communications, desktop themes, system tools etc. Windows 98 further provides a mechanism for uninstalling specific programs, referred to as the "Add/Remove Programs Properties." Likewise, Symantec Corporations Norton Uninstaller product provides a tool for removing programs or files. Further, in AIX, the user is presented with a list of all file sets on the system from which to select to remove.

Notwithstanding the above uninstaller tools, there is a need in the art to provide uninstaller tools that provide more fine grained control of uninstall operations than that provided with present products.

SUMMARY OF THE PREFERRED EMBODIMENTS

To overcome the limitations in the prior art described above, preferred embodiments disclose a system, method, and program for uninstalling a program. The program is defined by a plurality of file sets. Each file set defines a set of functions performed by the program. A flag is provided with each file set of the program indicating one of a first and second value. A determination is made as to the file sets having the first flag value. A graphical user interface (GUI) then displays at least one user selectable option to remove at least one determined file set having the first flag value. User input is then received indicating file sets to delete and the file sets the user input indicated to delete are deleted.

Preferred embodiments for uninstalling file sets comprise associating an indicator with a file set that indicates whether the file set is enabled to be uninstalled separately from other file sets of the program.

In further embodiments, displaying in the GUI at least one user selectable option to remove at least one file set comprises displaying one user selectable option to remove all the file sets of the program and displaying user selectable options to remove each determined file set having the first flag value.

In still further embodiments, a determination is made as to whether any of the file sets having one of the first and second values are subject to a dependency relationship. The GUI then displays indication of the dependency relationship after determining that one file set of the program is subject to the dependency relationship.

Preferred embodiments provide a method, system, and program for allowing an installation developer to specify file sets a user may uninstall by setting the value of a flag. Those file sets of the program having the flag set true may then be selectively uninstalled by the user without uninstalling other file sets not selected. This allows the user to remove certain file sets that the installation developer has indicated are acceptable to remove. For instance, the removal of certain file sets may affect the stability of the program. For such critical file sets, the installation developer may set the flag to false to not provide the user the opportunity to uninstall without removing the entire program. Still further embodiments determine a dependency relationship for files and display indication of the dependency relationship to alert the user that uninstallation of particular file sets may adversely affect the operation of other programs. Thus, preferred embodiments provide flexibility to installation developers to provide users greater control over the uninstallation process.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
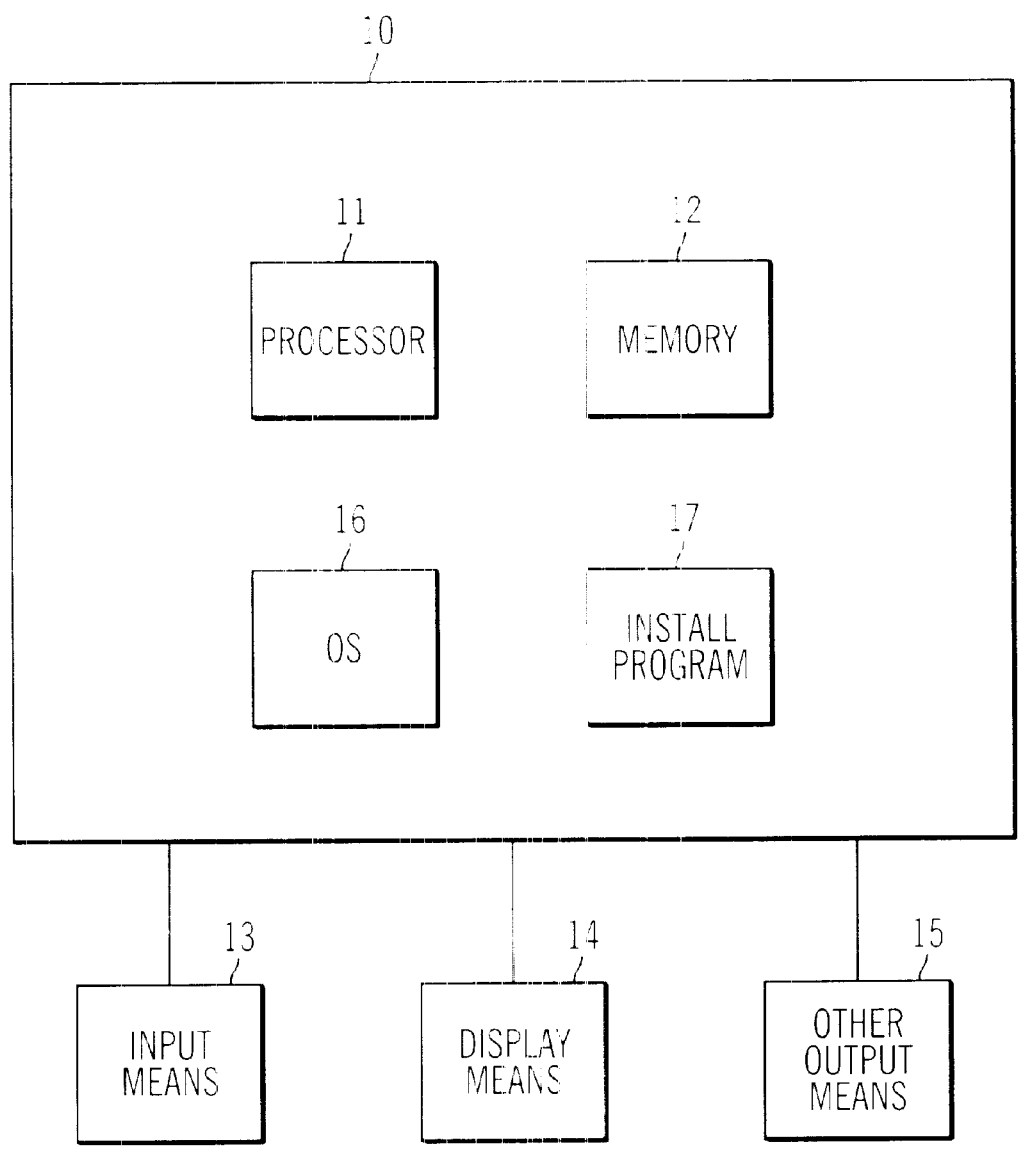
FIG. 1 is a block diagram illustrating a computing environment in which preferred embodiments of the present invention are implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard, mouse, track ball, light pen, pen-stylus, voice input system, touch-sensitive device, and/or any other input means known in the art. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed. The programs in memory 12 includes an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Installer Program

Figure 2:
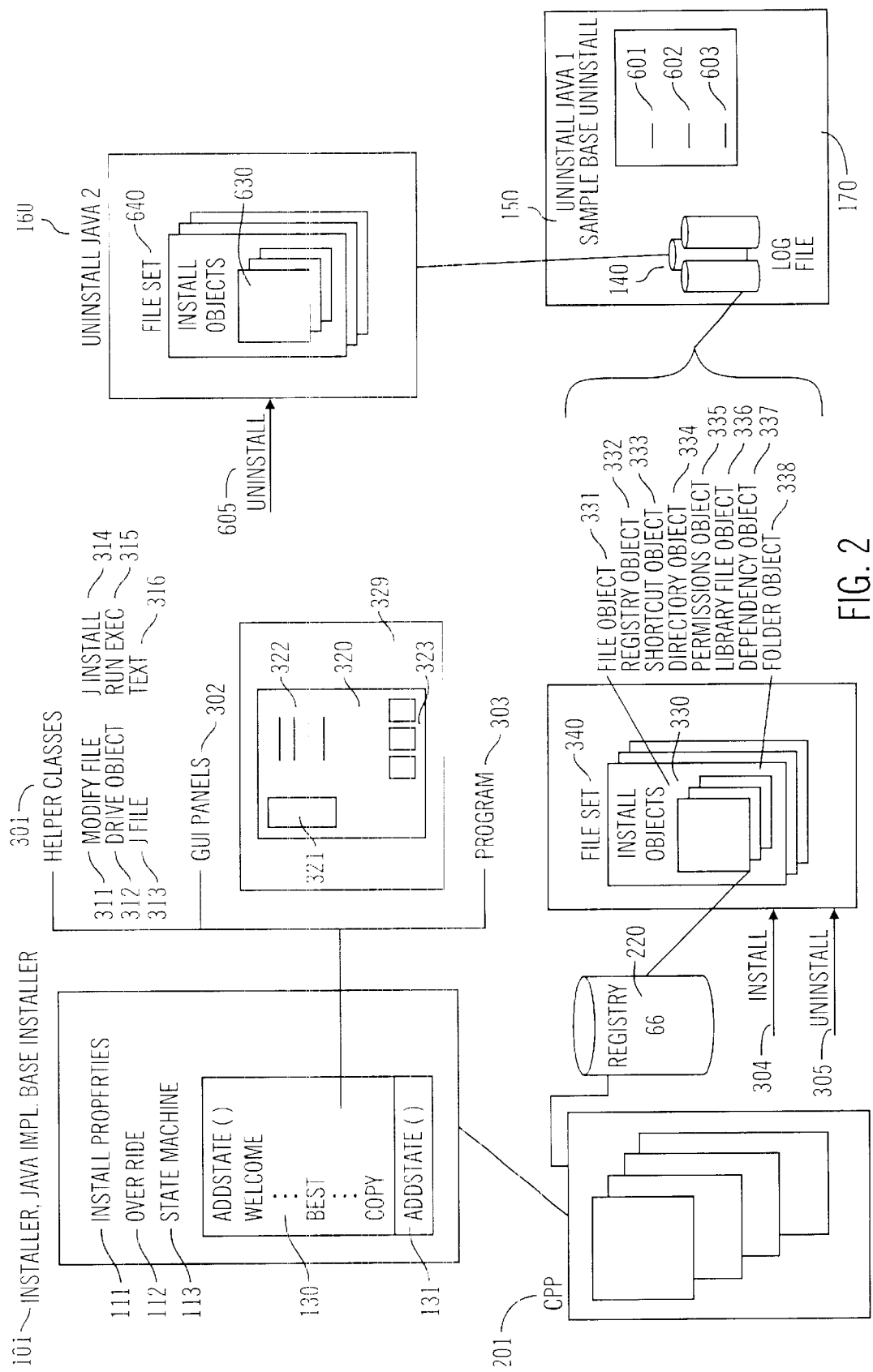
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. The term "file set" as used herein refers to any data, program components, help files, and/or data files, that comprise the program. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Java1" 150 which implements a "base uninstall" class, which includes several methods that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Logs are used for both the install and uninstall process. Furthermore, these logs are human readable which allows them to be checked, e.g., after a silent install, to ensure that a file has installed successfully. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, AS/400, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

The Base Uninstaller

As discussed, uninstall.Java2 160 processes the log file 140 to build uninstall file sets 640 and install objects 630 of an installed program to uninstall the installed components. The uninstall.Java2 160 program, i.e., Java2 160, is the generic uninstaller that operates the same across different programs. Java2 160 also reads in the log files 140 and, then processes the file set 640 and Install Objects 630 to determine the installed components to remove. The same Java2 160 program is called to uninstall program file sets 340 for all programs installed using the file set 340 structure. The uninstall.Java1 150 class, i.e., Java1 150, includes objects and methods that perform uninstall operations specific to the program being uninstalled. For instance, certain configuration files may need to be reconfigured and other files deleted in a manner that is unique to the program being uninstalled in order to restore the system to its pre-installation state. The code for such program specific uninstall operations is maintained in the Java1 program 150. The operations performed in the Java1 150 program may include delete operations, copying files, deleting database records, modifying configuration files, etc.

Selectively Uninstalling File Sets

Preferred embodiments provide a tool for allowing a user to selectively uninstall file sets that form the components of a software product. A file set is the atomic unit of an installation, that can be separately installed and uninstalled. A product is typically comprised of numerous file sets. File sets are grouped by recognizable functions, wherein a particular file set includes code for performing one or more distinct functions.

When creating the file sets that are used to install the product, the installation developer may specify an uninstall boolean variable within each file set that when set true indicates that the file set may be selectively uninstalled by a user. Each file set would include this uninstall boolean variable. The installation developer may set the uninstall boolean variable to false to prevent users from removing the associated file set separately from the program. The reason the installation developer would want to prevent a user from selectively uninstalling certain file set is that such file sets are critical for the product's operation. Removing such critical file sets could result in system instability. Thus, such file sets are only deleted when the entire product is removed. To indicate that a particular file set can be removed without having to remove the entire software product, such as a file set that is not critical for the product's operation, the installation developer would set the uninstall boolean variable to true to allow selective removal, uninstallation, of the file set.

Figure 3:
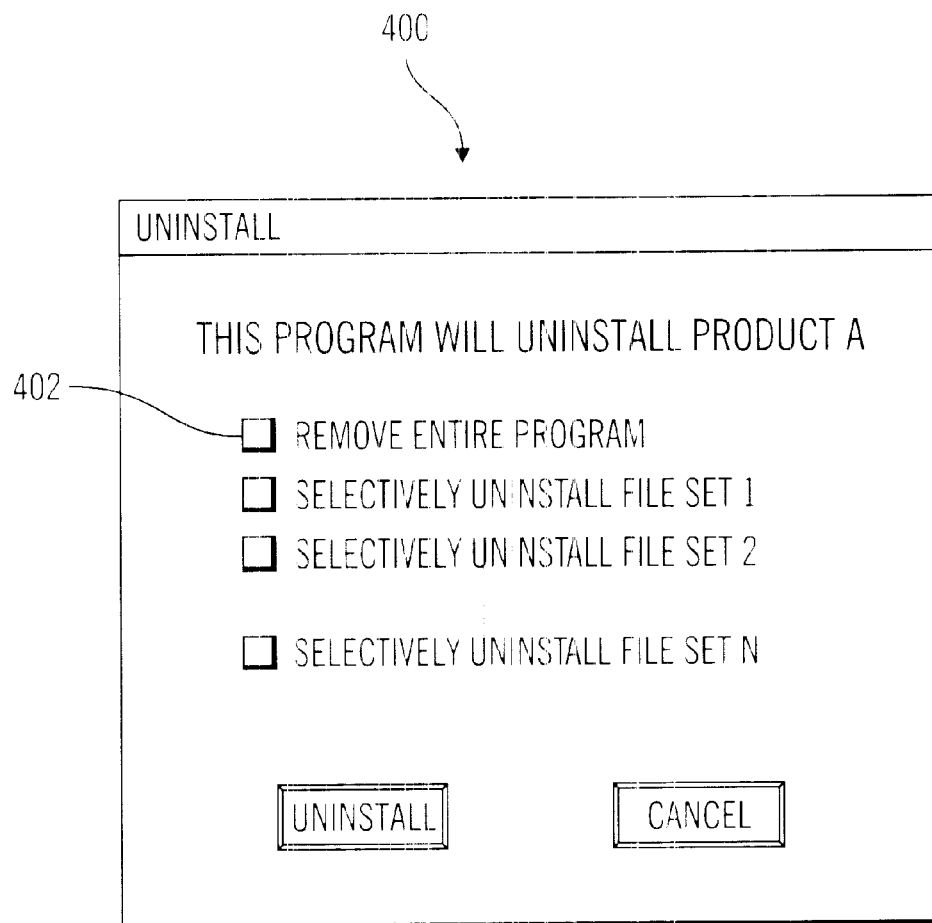
FIG. 3 illustrates a GUI panel in which the user may select uninstall options in accordance with preferred embodiments of the present invention.

FIG. 3 illustrates an uninstall GUI panel 400 displayed when a user selects to uninstall a product, e.g., Product A. The GUI panel 400 provides the user the option to remove the entire program 402 or selectively remove one or more of the N file sets for Product A. The displayed file sets that the user may selectively uninstall by selecting the check box are those that have an uninstall boolean value of true; indicating that the installation developer specified to allow users to selectively uninstall those file sets. Those file sets that have an uninstall boolean value of false can only be removed if the user selects the check box to remove the entire program 402, i.e., file sets having an uninstall value of true or false. Thus, only those file sets having an uninstall boolean value of true are separately displayed in the GUI panel 400 next to a check box. The user specifies to remove one or more file sets by selecting or checking the check box displayed next to the statement "Selectively Uninstall file set i." Upon selecting the "Uninstall" button 404, either the checked file sets will be deleted or, if box 402, is selected all the file sets for Product A are moved.

Figure 4:
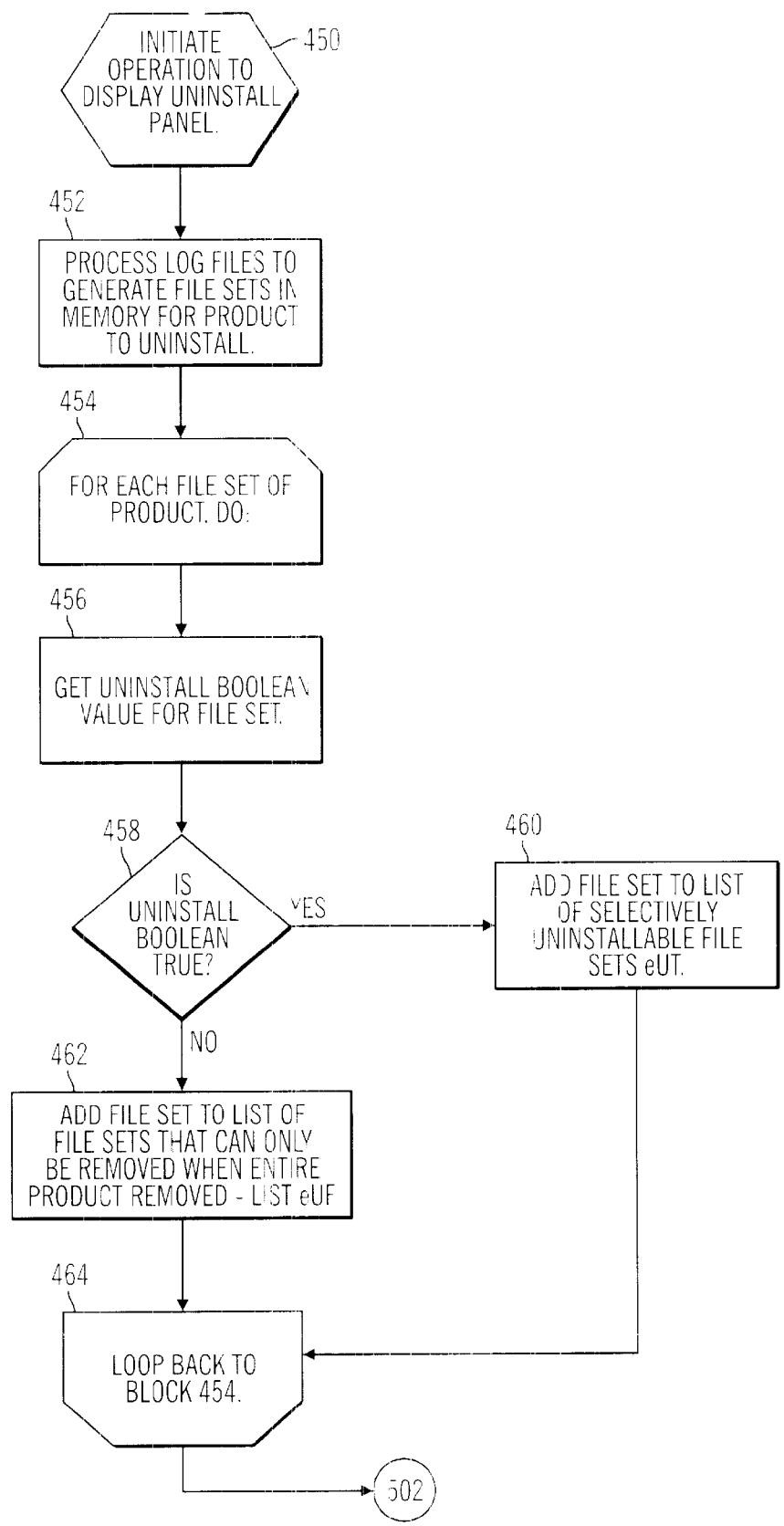
FIG. 4 illustrates logic to determine selectively uninstallable file sets in accordance with preferred embodiments of the present invention.
Figure 5:
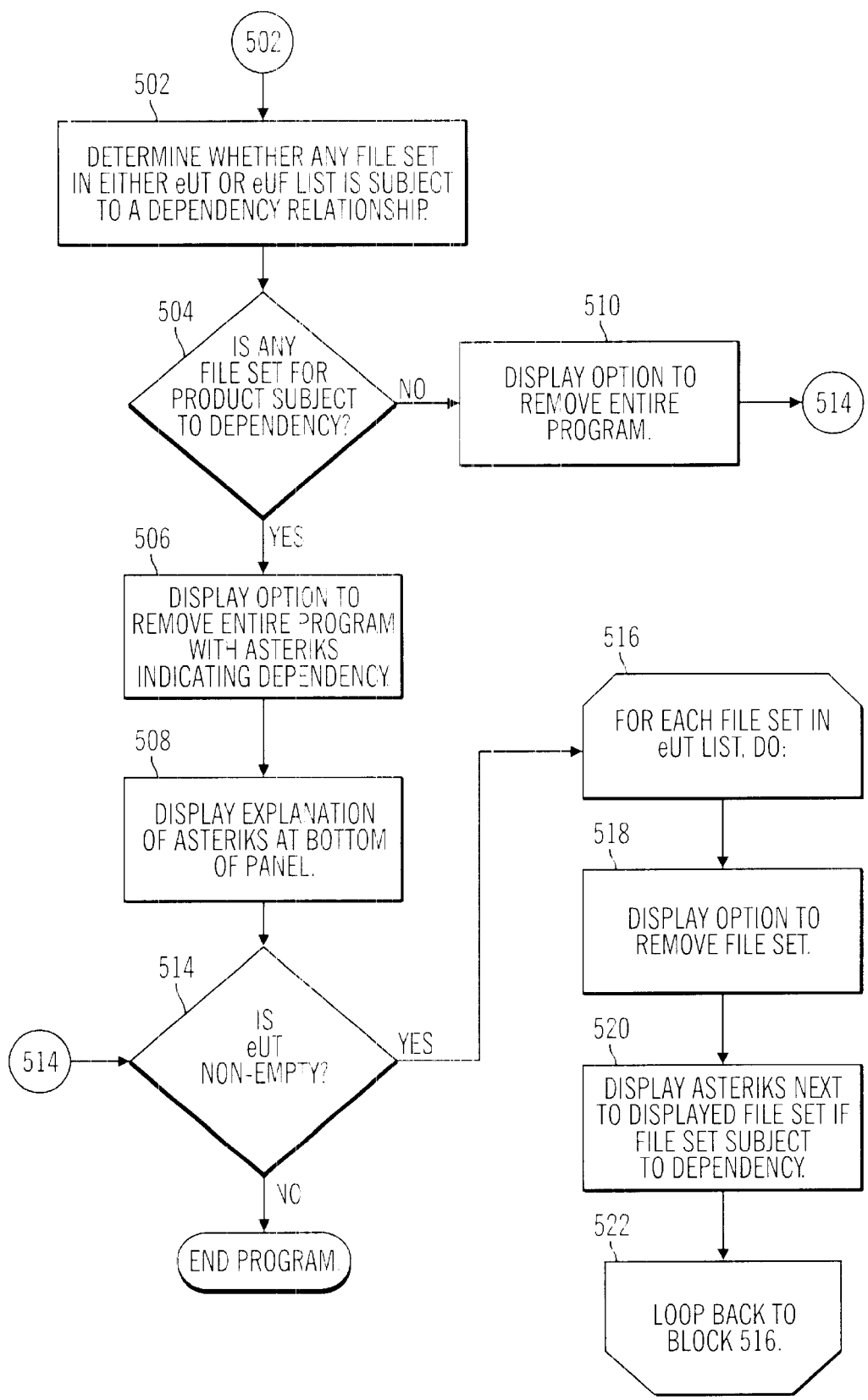
FIG. 5 illustrates logic to display the uninstall panel illustrated in FIG. 3 in accordance with preferred embodiments of the present invention.
Figure 6:
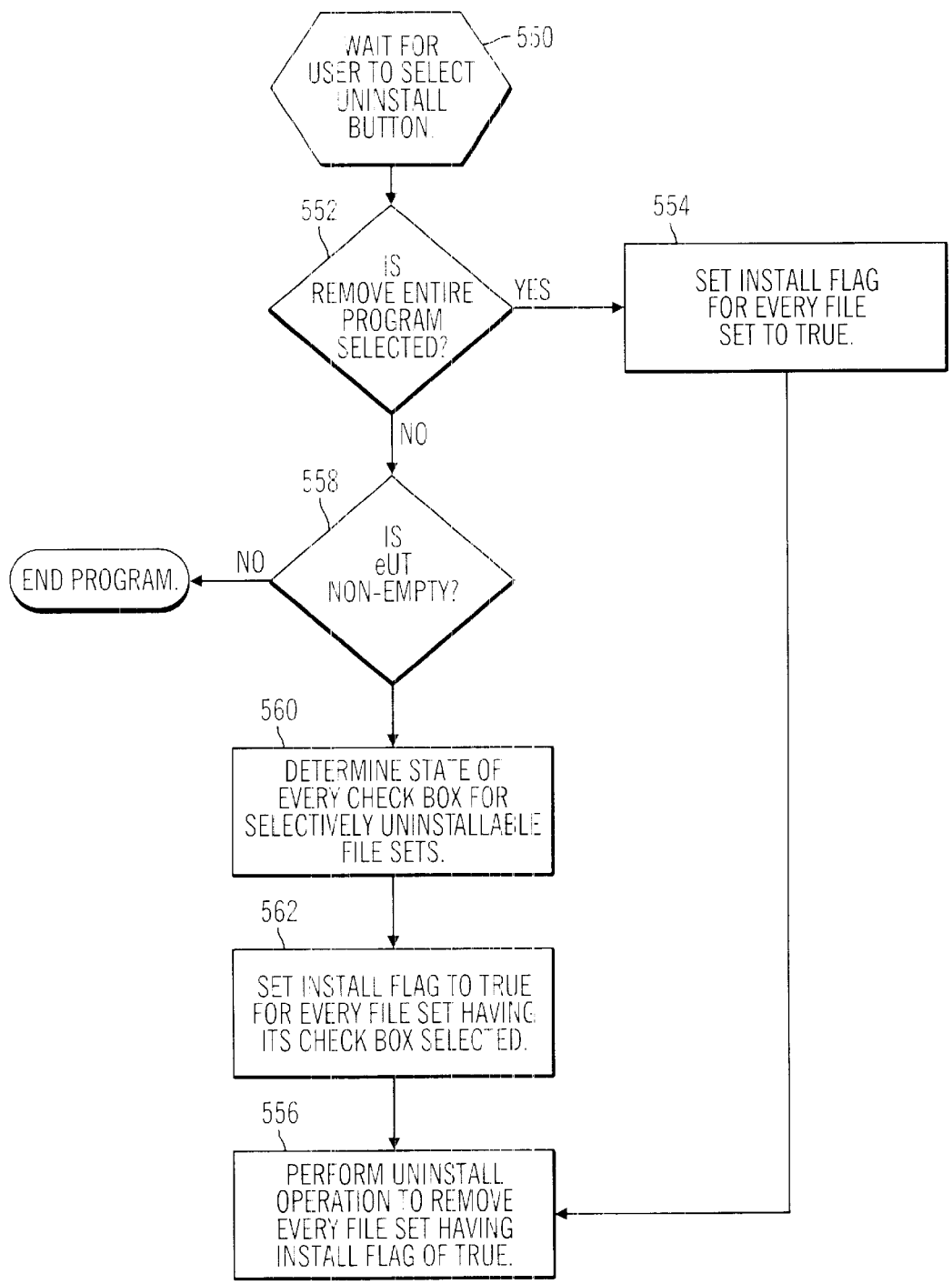
FIG. 6 illustrates logic to delete file sets the user selected to delete in accordance with preferred embodiments of the present invention.

FIGS. 4, 5, and 6 illustrate logic implemented in the generic uninstaller Java2 160 to display the uninstall GUI panel 400 and allow the user to uninstall file sets for a product.

FIG. 4 illustrates logic implemented in the generic uninstaller Java2 160 in response to a user initiating (at block 450) the uninstall panel 400 to uninstall file sets of product A. The uninstaller processes (at block 452) the log files 140 including the file sets for Product A to generate uninstall file sets 640 in memory 12 for the Product A. The uninstaller then begins a loop (at block 454) for each file set comprising product A. First, the uninstaller gets (at block 456) the uninstall boolean value for the file set and then determines (at block 458) whether the uninstall boolean value is true. If so, the uninstaller adds (at block 460) the file set to the list of selectively uninstallable file sets, referred to as the enable uninstall true (eUT) list, indicating those file sets a user may uninstall. Otherwise, the uninstaller adds (at block 462) the file set to the list of base file sets, or those that are not permitted to be selectively uninstalled, referred to as the enable uninstall false (eUF) list. After adding the file set to one of the lists, another iteration of the loop is performed (at block 464) to consider the next file set comprising product A.

From block 464, control proceeds to block 502 in FIG. 5 where the uninstaller determines whether any file set on either the eUT or eUF list is subject to a dependency relationship where another product requires the installation of the file set in order to perform certain functions. This information could be obtained by processing a dependency data structure or database indicating dependencies of files and programs. The uninstaller then determines whether any file set for the product to uninstall is subject to a dependency relationship. If so, the uninstaller displays (at block 506) the check box 402 option to remove the entire program and an asterik (*) adjacent to the remove entire program option. An explanation (at block 508) as to the meaning of the asteriks is also displayed in the panel 400. FIG. 3 illustrates the text with the asteriks displayed at the bottom of the page. However, the text with asteriks may be displayed in any manner in the panel 400. If no file set for the product is subject to a dependency relationship, then the uninstaller displays (at block 510) the option to remove the entire program, shown as 402 in FIG. 3, without an asteriks.

In preferred embodiments, the display of the asteriks next to a displayed file set to uninstall indicates to the user that the selectively removable file set is subject to a dependency relationship. It is then up to the user to decide whether to nonetheless proceed and uninstall that file set.

After displaying the option to remove the entire product, i.e., all file sets comprising the product, at blocks 508 or 510, the uninstaller determines (at block 514) whether eUT is non-empty. If so, then the uninstaller performs a loop of operations (at block 516) for each file set in the eUT which may be selectively uninstalled. For each such file set, the uninstaller displays (at block 518) a check box along with the file set name that may be selectively uninstalled, which is shown in FIG. 3. The uninstaller also displays (at block 520) an asteriks next to the displayed file set name if the file set is subject to a dependency relationship, as determined at block 502. Another iteration of the loop (at block 522) is performed to consider a next file set in the eUT list. In this way, a check box and file set name for all selectively uninstalled file sets are displayed in the uninstall panel 400. If the eUT list is empty (at block 514), then the program ends.

FIG. 6 illustrates logic the uninstaller performs when the user selects (at block 550) the "Uninstall" button in the panel 400 (FIG. 3). First, the uninstaller determines whether the check box for the remove entire program 402 is selected. If so, the uninstaller sets (at block 554) an install flag for every file to true. Otherwise, the uninstaller determines (at block 558) whether the eUT list is non-empty. If the eUT list is empty, then the program ends. Otherwise, if eUT is not empty, then the uninstaller determines (at block 560) the state of the check box for every selectively uninstallable file set displayed in the panel 400. The uninstaller then sets (at block 562) the install flag to true for every file set having its check box selected. After checking the check boxes for all the displayed selectively uninstallable file sets, the uninstaller performs (at block 556) the uninstall operation to uninstall every file set having an install flag of true.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments of the install program 17 and install kit were described as implemented in the Java programming language. However, any other object oriented programming language or other programming language may be used to implement the install program 17 and provide the user with tools to develop an install script.

Preferred embodiments were described with respect to a generic uninstaller Java2, implemented in the Java computer language. However, in alternative embodiments the uninstaller may be implemented in other computer languages.

Preferred embodiments were described with respect to using check boxes to determine the uninstall options the user selects. However, in alternative embodiments, any graphical technique or input system known in the art for receiving user input may be used to receive user input on file sets to uninstall.

In summary, preferred embodiments disclose a method, system, and program for uninstalling a program. The program is defined by a plurality of file sets. Each file set defines a set of functions performed by the program. A flag is provided with each file set of the program indicating one of a first and second value. A determination is made as to the file sets having the first flag value. A graphical user interface (GUI) then displays at least one user selectable option to remove at least one determined file set having the first flag value. User input is then received indicating file sets to delete and the file sets the user input indicated to delete are deleted.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for creating an installation package including components to uninstall an application program from a user computer, wherein the application program is defined by a plurality of file sets, comprising:

providing, by an installation developer creating an installation package to install the program file sets on the user computer, a flag with each file set of the application program included in the installation package indicating one of a first and second value, wherein the flag is maintained with the file set installed on the user computer;

setting, by the installation developer, the flag for one file set to the first value to enable a user of the installation package to uninstall the file set separate from other file sets in the application program or to the second value to preclude the user from uninstalling the file set separate from other file sets in the application program;

including code in the installation package that when installed on the user computer causes the user computer to perform:

(i) determining the file sets installed on the user computer having the first flag value;

(ii) displaying in a graphical user interface (GUI) at the user computer at least one user selectable option to uninstall at least one determined file set having the first flag value;

(iii) receiving user input indicating file sets displayed in the GUI to uninstall;

(iv) uninstalling the file sets the user input indicated to uninstall.

2. The method of claim 1, wherein displaying in the GUI at least one user selectable option to uninstall at least one file set comprises:

displaying one user selectable option to uninstall all the file sets of the application program; and displaying user selectable options to uninstall each determined file set having the first flag value.

3. The method of claim 1, wherein displaying the user selectable option comprises displaying a check box adjacent to a description of the user selectable option, wherein the description indicates at least one file set, wherein each check box is capable of receiving user indication to uninstall each file set indicated in the adjacent description.

4. The method of claim 1, wherein receiving user input indicating file sets to uninstall comprises:

processing a user selectable option to uninstall all the file sets of the application program to determine whether the user selected to uninstall all the file sets of the application program;

indicating all the file sets in the application program to uninstall after determining that the user selected to uninstall all of the file sets;

processing, after determining that the user did not select to uninstall all of the file sets, the user selectable options to uninstall each determined file set to determine the file sets of the application program having the first flag value that the user selected to uninstall; and indicating those file sets having the first flag value the user selected to uninstall.

5. The method of claim 1, wherein the code included in the installation package further causes the user computer to perform:

determining whether any of the file sets having one of the first and second values are subject to a dependency relationship; and displaying in the GUI indication of the dependency relationship after determining that one file set of the program is subject to the dependency relationship.

6. The method of claim 5, wherein displaying in the GUI indication of the dependency relationship comprises displaying indication of dependency adjacent to the display in the GUI of a user selectable option to uninstall all file sets of the application program.

7. The method of claim 5, wherein displaying in the GUI indication of dependency comprises:

determining whether any file set having the first flag value is subject to a dependency relationship; and displaying indication of dependency adjacent to each display in the GUI of a user selectable option to uninstall one determined file set having the first flag value and subject to the dependency relationship.

8. The method of claim 1, wherein deleting the file sets the user input indicated to uninstall comprises:

determining whether the user selected an option to uninstall all of the file sets of the application program;

setting an uninstall flag for every file set in the application program after determining that the user selected the option to uninstall all of the file sets;

determining any file sets having the first flag value the user selected to uninstall after determining that the user did not select the option to uninstall all of the file sets;

setting an uninstall flag for each determined file set having the first flag value the user selected to uninstall; and deleting each file set for which the uninstall flag was set.

9. A computer system for creating an installation package including components to uninstall an application program from a user computer, comprising:

a computer;

a display monitor controlled by the computer;

a storage area including the application program, wherein the application program is defined by a plurality of file sets;

program logic executed by the computer, comprising:

(i) means for providing, by an installation developer creating an installation package to install the program file sets on the user computer, a flag with each file set of the application program included in the installation package indicating one of a first and second value, wherein the indicator is maintained with the file set installed on the user computer;

(ii) means for setting, by the installation developer, the flag for one file set to the first value to enable a user of the installation package to uninstall the file set separate from other file sets in the application program or to the second value to preclude the user from uninstalling the file set separate from other file sets in the program; and (iii) means for including code in the installation package that when installed on the user computer causes the user computer to perform:

(a) determining the file sets installed on the user computer having the first flag value;

(b) displaying on the monitor a graphical user interface (GUI) at the user computer including at least one user selectable option to uninstall at least one determined file set having the first flag value; and (c) receiving user input indicating file sets displayed in the GUI to uninstall; and (d) deleting the file sets the user input indicated to uninstall.

10. The system of claim 9, wherein the program logic for displaying in the GUI at least one user selectable option to uninstall at least one file set comprises:

means for displaying one user selectable option to uninstall all the file sets of the application program; and means for displaying user selectable options to uninstall each determined file set having the first flag value.

11. The system of claim 9, wherein the program logic for displaying the user selectable option comprises means for displaying a check box adjacent to a description of the user selectable option, wherein the description indicates at least one file set, wherein each check box is capable of receiving user indication to uninstall each file set indicated in the adjacent description.

12. The system of claim 9, wherein the program logic for receiving user input indicating file sets to uninstall comprises:

means for processing a user selectable option to uninstall all the file sets of the application program to determine whether the user selected to uninstall all the file sets of the application program;

means for indicating all the file sets in the application program to uninstall after determining that the user selected to uninstall all of the file sets;

means for processing, after determining that the user did not select to uninstall all of the file sets, the user selectable options to uninstall each determined file set to determine the file sets of the application program having the first flag value that the user selected to uninstall; and means for indicating those file sets having the first flag value the user selected to uninstall.

13. The system of claim 9, wherein the code included in the installation package further causes the user computer to perform:

determining whether any of the file sets having one of the first and second values are subject to a dependency relationship; and displaying in the GUI indication of the dependency relationship after determining that one file set of the program is subject to the dependency relationship.

14. The system of claim 13, wherein displaying in the GUI indication of the dependency relationship comprises displaying indication of dependency adjacent to the display in the GUI of a user selectable option to uninstall all file sets of the program.

15. The system of claim 13, wherein displaying in the GUI indication of dependency comprises:
- determining whether any file set having the first flag value is subject to a dependency relationship; and
- displaying indication of dependency adjacent to each display in the GUI of a user selectable option to uninstall one determined file set having the first flag value and subject to the dependency relationship.

16. The system of claim 9, wherein deleting the file sets the user input indicated to uninstall comprises:
- determining whether the user selected an option to uninstall all of the file sets of the application program;
- setting an uninstall flag for every file set in the program after determining that the user selected the option to uninstall all of the file sets;
- determining any file sets having the first flag value the user selected to uninstall after determining that the user did not select the option to uninstall all of the file sets;
- setting an uninstall flag for each determined file set having the first flag value the user selected to uninstall; and
- deleting each file set for which the uninstall flag was set.

17. An article of manufacture for creating an installation package including components to use in uninstalling an application program from a user computer, wherein the application program is defined by a plurality of file sets, wherein each file set defines a set of functions performed by the application program, the article of manufacture comprising computer useable media accessible to a computer, wherein the computer usable media includes at least one computer program that is capable of causing the computer to perform:
- providing, by an installation developer creating an installation package to install the application program file sets, a flag with each file set of the application program indicating one of a first and second value;
- setting, by the installation developer, the flag for one file set to the first value to enable a user of the installation package to uninstall the file set separate from other file sets in the application program or to the second value to preclude the user from uninstalling the file set separate from other file sets in the application program; and
- including code in the installation package that when installed on the user computer causes the user computer to perform:
  - (i) determining the file sets having the first flag value;
  - (ii) displaying in a graphical user interface (GUI) at least one user selectable option to uninstall at least one determined file set having the first flag value;
  - (iii) receiving user input indicating file sets displayed in the GUI to uninstall; and
  - (iv) deleting the file sets the user input indicated to uninstall.

18. The article of manufacture of claim 17, wherein displaying in the GUI at least one user selectable option to uninstall at least one file set comprises:
- displaying one user selectable option to uninstall all the file sets of the application program; and
- displaying user selectable options to uninstall each determined file set having the first flag value.

19. The article of manufacture of claim 17, wherein displaying the user selectable option comprises displaying a check box adjacent to a description of the user selectable option, wherein the description indicates at least one file set, wherein each check box is capable of receiving user indication to uninstall each file set indicated in the adjacent description.

20. The article of manufacture of claim 17, wherein receiving user input indicating file sets to uninstall comprises:
- processing a user selectable option to uninstall all the file sets of the program to determine whether the user selected to uninstall all the file sets of the application program;
- indicating all the file sets in the application program to uninstall after determining that the user selected to uninstall all of the file sets;
- processing, after determining that the user did not select to uninstall all of the file sets, the user selectable options to uninstall each determined file set to determine the file sets of the application program having the first flag value that the user selected to uninstall; and
- indicating those file sets having the first flag value the user selected to uninstall.

21. The article of manufacture of claim 17, wherein the code included in the installation package further causes the user computer to perform:
- determining whether any of the file sets having one of the first and second values are subject to a dependency relationship; and
- displaying in the GUI indication of the dependency relationship after determining that one file set of the program is subject to the dependency relationship.

22. The article of manufacture of claim 21, wherein displaying in the GUI indication of the dependency relationship comprises displaying indication of dependency adjacent to the display in the GUI of a user selectable option to uninstall all file sets of the application program.

23. The article of manufacture of claim 21, wherein displaying in the GUI indication of dependency comprises:
- determining whether any file set having the first flag value is subject to a dependency relationship; and
- displaying indication of dependency adjacent to each display in the GUI of a user selectable option to uninstall one determined file set having the first flag value and subject to the dependency relationship.

24. The article of manufacture of claim 17, wherein deleting the file sets the user input indicated to uninstall comprises:
- determining whether the user selected an option to uninstall all of the file sets of the application program;
- setting an uninstall flag for every file set in the program after determining that the user selected the option to uninstall all of the file sets;
- determining any file sets having the first flag value the user selected to uninstall after determining that the user did not select the option to uninstall all of the file sets;
- setting an uninstall flag for each determined file set having the first flag value the user selected to uninstall; and
- deleting each file set for which the uninstall flag was set.

* * * * *